Nov. 19, 1929.  E. A. WYSS  1,736,240
SUSPENSION DEVICE
Filed Feb. 17, 1928
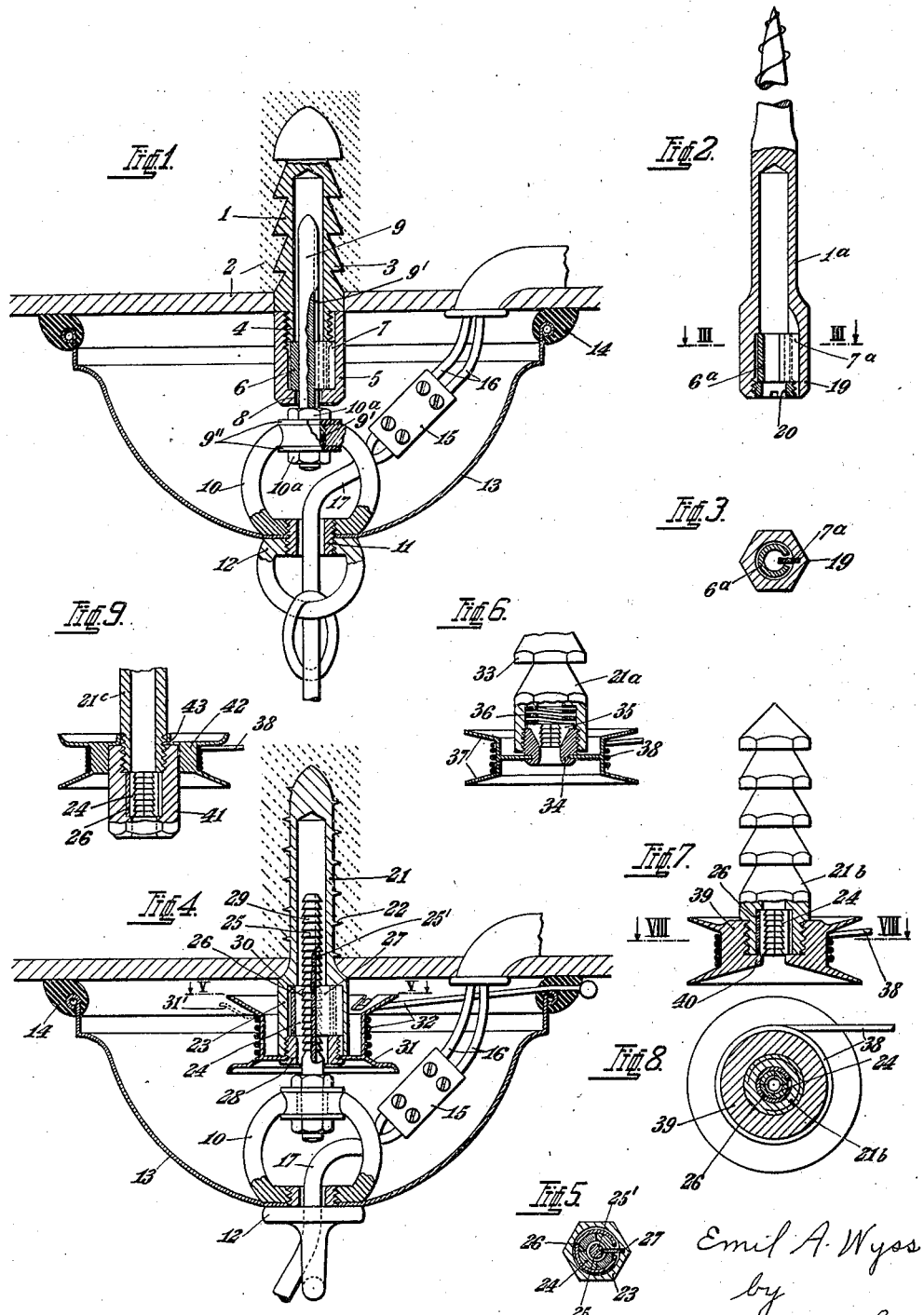

Patented Nov. 19, 1929

1,736,240

UNITED STATES PATENT OFFICE

EMIL A. WYSS, OF BERN, SWITZERLAND, ASSIGNOR OF ONE-THIRD TO NATHAN MEDOFSKY AND ONE-THIRD TO EDGAR HECKER, BOTH OF BERN, SWITZERLAND

SUSPENSION DEVICE

Application filed February 17, 1928, Serial No. 255,138, and in Switzerland February 18, 1927.

This invention relates to a device for suspending electric lamps, lanterns, electroliers and the like. Suspension devices of this kind known heretofore do not permit the ceiling rosettes, used for hiding the joints in the wires and the suspension means, to fit close to the ceiling.

An important object of the invention is to arrange in a part to be attached in the ceiling, a clasp into which can be inserted from below a support for the ceiling rosette and a lamp, lantern, electrolier or the like, so that it is held by the said clasp.

Another object of the invention is to construct the clasp and support in such a manner that the latter, after being inserted into the clasp, can be removed from the part fastened in the ceiling only together with the clasp.

Other features of the invention will be described hereinafter and pointed out in the claims.

Several embodiments of the invention are diagrammatically illustrated by way of example in the accompanying drawing, wherein:—

Figure 1 is a vertical section through a preferred construction of suspension device according to the invention, Figure 2 is a like view of a modified form of the part to be fixed in the ceiling, and Figure 3 is a cross-section taken on the line III—III in Figure 2;

Figure 4 is a vertical section of a modified construction of suspension device, and Figure 5 is a cross-section taken on the line V—V in Figure 4;

Figures 6 and 7 are vertical sections showing each a modified part to be fixed in the ceiling, Figure 8 is a cross-section taken on the line VIII—VIII in Figure 7 as seen from above, and Figure 9 shows another modified part to be fixed in the ceiling.

Referring first to Figure 1, an anchor bolt 1 in the form of a socket to be fixed in a wall, such as a ceiling, is provided with annular ribs 3 thus giving it a toothed appearance as viewed in section; the lower end 4 of the socket 1 is screw-threaded and extends downwards out of the ceiling. On this end 4 is screwed a cap screw 5 which accommodates within it a cylindrical spring 6 split along its periphery and a guide portion 7 that extends into the gap between the ends of the spring. A suspension bolt 9 having a smooth periphery is pushed through a central opening 8 in the cap screw 5 and through the spring 6; this bolt 9 has a longitudinal groove 9''' into which the guide 7 extends and thereby prevents the bolt 9 from turning. The spring 6 clasps the bolt 9 and holds it with a preedtermined force. Consequently, to remove the bolt 9 out of the spring 6 constituting the clasp aforesaid an expenditure of energy or a corresponding weight that will overcome the said force will be required. A swivel ring 10 is arranged at the lower end of the bolt 9 by means of two nuts 10ª and an insulating bush 9' and washers 9'', which ring 10 is screwed below on to a coupling sleeve 11. A nut 12 constituting a ring or tube is screwed from below on to the sleeve 11, from which nut 12 an electric lamp, not shown, is suspended. A ceiling rosette 13 is clamped between the sleeve 11 and the nut 12, and has at its upper edge an elastic packing ring. The usual coupling for connecting the electric wires 16 and 17 is designated 15.

When erecting a lamp or electrolier, after the wires 16 and 17 have been connected by the coupling 15 the bolt 9 can be pushed from below into the clasp or spring 6 until the joint ring 14 lies against the ceiling, whereby the lamp, electrolier or the like is completely erected. For removing the lamp, for example for effecting repairs, it is only necessary to pull the ring of the nut 12 sufficiently powerfully, whereby the bolt 9 will be pulled out of the clasp 6, the rosette 13 moved away from the ceiling and the coupling 15 exposed.

In the construction illustrated in Figures 2 and 3 the socket 1ª to be fixed in the ceiling is formed as a wood screw and has in its lower part a bore hole 18 and a polygonal hollow head 19. In the latter are situated the spring clasp 6ª and the guide key 7ª which are secured against falling out of the head 19 by a ring 20 screwed from below into the latter. The remainder of the suspension device is made the same as or similar to that shown in Figure 1 and therefore need not be further described. Also the manipulation and operation of this form is the same as that described above.

Figure 4 shows a construction of suspension device in which the socket 21 to be fixed in the ceiling has external ribs in the form of a screw thread 22. The socket 21 is provided at its lower end with a cylindrical hollow head 23 containing four anchor-segments 24 for the bolt 25, a cylindrical spring 26 embracing the segments 24 and a key 27 that extends through the gap in the spring into the groove 25¹ in the bolt 25 and prevents the latter from turning. The parts 24, 26 and 27 are retained in the head 23 by a ring 28 screwed from below into the latter. The suspension bolt 25 is provided on its periphery with ribs 29 of tooth-like appearance in section, and the segments 24 have corresponding grooves 30 in their inner faces. At the lower end of the bolt 25 are connected the same parts as in the construction shown in Figure 1. These parts are designated by the same reference characters and include the swivel ring 10, coupling sleeve 11, nut 12 and ceiling rosette 13 with the joint ring 14. The electrical parts 15, 16, 17 are also the same as in Figure 1. In consequence of the ratchet toothing of the bolt 25 and segments 24 it is not possible to withdraw the bolt from the segments unless the ring 28 has been removed from the head 23 of the socket 21. In order to enable this to be done from outside the ceiling rosette which fits snugly against the ceiling the ring 28 has attached to it, e. g., by riveting or welding, a pulley 31 whereon is wound an insulated wire cable 32 or other flexible tie which is readily detachably held, e. g. lightly clamped, between the upper edge of the pulley and a resilient lug 31' pressed down out of that edge. The cable is led outwards through the joint ring 14 and provided at its outer end with a knob for conveniently and securely gripping it, e. g. by means of a tool, such as tongs or the like. When the cable 32 is pulled the pulley 31 is rotated with the ring 28 which is thereby unscrewed from the head of the socket. The bolt 25 will then fall down with the members 24, 26 and 27.

Figure 6 shows a modification of the part to be fixed in the ceiling, the remainder of the suspension device being the same as shown in Figure 4. In this modification the socket 21ᵃ has anchor ribs 33 which are polygonal for preventing rotation in the ceiling. A ring 34 which is coned internally at its upper end is screwed from below into the socket 21ᵃ, which ring contains in its upper conical part a conical clasp 35 comprising several segments for the suspension bolt. A spiral spring 36 tends to press the clasp 35 downwards, its segments being pressed inwards by their conical seat against the suspension bolt. The latter cannot be withdrawn without first screwing the ring 34 out of the socket 21ᵃ. The ring 34 can be unscrewed by means of a pulley 37 fast on it and a wire cable 38 wound thereon, which cable, as shown in Figure 4, is led outwards through the joint ring of the ceiling rosette.

Referring now to Figures 7 and 8, the part to be fixed in the ceiling has its lower end formed as a socket 21ᵇ on which is screwed a nut 39 constituting a pulley. This nut has an inwardly directed flange 40 which retains in the enlarged lower part of the bore of the socket 21ᵇ the segments 24 formed as shown in Figures 4 and 5, and the clamping spring 26 that urges the segments inwards. The nut 39 can be unscrewed, for removing the suspension bolt which is held by the segments 24, as in the examples according to Figures 6 and 4, by pulling the cable 38 wound on the nut.

Figure 9 shows a modified form of socket 21ᶜ to be screwed into a ceiling, on the lower end of which is screwed a cap screw 41 that holds the toothed clamping segments 24 and clasping spring 26 in the enlarged cavity at the end of the bore of the socket 21ᶜ. The cap screw 41 can be unscrewed by a pulley 42 and a tie 38 wound thereon. An upper inwardly extending flange or rim 43 of the pulley 42 bears on the top of the cap screw 41; the latter and the body of the pulley embracing the same are both polygonal. Consequently, the pulley 42 cannot rotate relatively to the cap screw, so that when the pulley is turned by pulling on the tie 38 the cap screw 41 will also be turned. The remainder of the suspension device is constructed in the same manner as described above with reference to Fig. 4.

The invention is not restricted to the precise constructional details enumerated, as various modifications may be made without departing from the scope of the invention as defined in the claims.

I claim:—

1. A suspension device for electric lamps and the like, comprising in combination an anchor member having an external rib at one end and a cavity in its other end, a clasp comprising a plurality of segments and a spring embracing the latter accommodated in said cavity, a rotatable retaining member mounted on the anchor member and retaining the clasp therein, a bolt extending through said retaining member into said clasp, which bolt has external teeth for engaging in grooves in the internal periphery of said segments, a ceiling rosette and suspension means carried by said bolt, a pulley fast on said retaining member, and a tie that is wound on said pulley and extends through said rosette.

2. A suspension device for electric lamps and the like, comprising in combination an anchor member having an external rib at one end and a cavity in its other end, a clasp comprising a plurality of tapered segments, a ring that is screwed in said cavity and has a conical seat in which said segments are seated, and a spring tending to hold said segments on their seat, a bolt extending through said clasp, which bolt has external teeth for engaging teeth on the said segments, a ceiling rosette and suspension means carried by said bolt, an elastic joint ring carried by the free edge of said rosette, a pulley fast on said ring, and a tie that is wound on said pulley and extends through said joint ring.

3. A suspension device for electric lamps and the like, comprising in combination an externally ribbed anchor member having a cavity at one end, a resilient clasp comprising a plurality of spring-pressed segments having inwardly directed teeth accommodated in said cavity, a cap screw secured in said member for retaining said clasp in said cavity, a bolt that extends through said cap screw and said clasp, which bolt has teeth arranged to engage the teeth of said segments, a ceiling rosette and suspension means carried by said bolt, a joint ring carried by the free edge of said rosette, a pulley fast on said cap screw, and a tie that is wound on said pulley and extends through said joint ring.

4. A suspension device for electric lamps and the like, comprising in combination an externally ribbed anchor member having a cavity at one end, an annular resilient clasp comprising a plurality of spring-pressed segments having inwardly directed teeth removably accommodated in said cavity, a polygonal cap screw carried by said member and retaining said clasp in said cavity, a bolt that extends through said cap screw and said clasp, and has teeth for engaging the teeth of said segments, a ceiling rosette and means for carrying a lamp carried by said bolt, a pulley carried by said cap screw and rotatable therewith, a joint ring mounted on the free edge of said rosette, and a tie wound on said pulley and extending beyond the free edge of said rosette.

In testimony whereof I affix my signature.

EMIL A. WYSS.